United States Patent
Grossman

(10) Patent No.: US 8,033,559 B2
(45) Date of Patent: Oct. 11, 2011

(54) HUMAN-PROPELLED VEHICLES

(75) Inventor: Martin Grossman, Glasgow (GB)

(73) Assignee: H. Grossman Limited, Glasgow (GB)

( * ) Notice: Subject to any disclaimer, the term of this patent is extended or adjusted under 35 U.S.C. 154(b) by 41 days.

(21) Appl. No.: 11/627,364

(22) Filed: Jan. 25, 2007

(65) Prior Publication Data

US 2007/0267844 A1 Nov. 22, 2007

(30) Foreign Application Priority Data

Jan. 25, 2006 (GB) ................................. 0601500.2

(51) Int. Cl.
*B62K 7/00* (2006.01)

(52) U.S. Cl. ...................... 280/288.4; 340/475; 362/473

(58) Field of Classification Search ............... 280/288.4, 280/293, 282; 362/473, 474, 459; 340/432, 340/475

See application file for complete search history.

(56) References Cited

U.S. PATENT DOCUMENTS

| | | | | |
|---|---|---|---|---|
| 1,993,675 | A * | 3/1935 | Long ............................. | 362/505 |
| 3,091,212 | A * | 5/1963 | McCauley ...................... | 116/50 |
| 3,565,489 | A | 2/1971 | Eirinberg et al. ............... | 301/37 |
| D289,273 | S * | 4/1987 | Berger ......................... | D12/112 |
| 5,016,144 | A | 5/1991 | DiMaggio | |
| 5,418,696 | A * | 5/1995 | Izzo, Sr. ......................... | 362/473 |
| 5,418,697 | A * | 5/1995 | Chiou ............................ | 362/473 |
| D373,839 | S | 9/1996 | Rasul ............................. | D26/28 |
| 5,584,562 | A | 12/1996 | Geran ............................ | 362/72 |
| 5,617,303 | A * | 4/1997 | Izzo, Sr. ......................... | 362/473 |
| 5,683,164 | A | 11/1997 | Chien ............................ | 362/78 |
| 5,803,574 | A * | 9/1998 | Szaniszlo ...................... | 362/551 |
| 5,863,058 | A * | 1/1999 | Jinks ............................. | 280/202 |
| 5,876,108 | A | 3/1999 | Chien | |
| 5,933,076 | A * | 8/1999 | Babb ............................ | 340/475 |
| 6,072,386 | A | 6/2000 | Yu ................................. | 340/432 |
| D436,896 | S | 1/2001 | Chiappepta et al. ......... | D12/113 |
| D484,073 | S | 12/2003 | Heinemann et al. ......... | D12/112 |
| 6,685,206 | B1 * | 2/2004 | Blake ............................ | 280/278 |
| 6,690,266 | B1 * | 2/2004 | Jack et al. ..................... | 340/432 |
| 7,048,421 | B1 | 5/2006 | Allen-Atkins ................ | 362/500 |
| 7,073,618 | B1 * | 7/2006 | Song ............................. | 180/219 |
| 7,347,597 | B2 * | 3/2008 | French ......................... | 362/485 |
| 7,425,893 | B2 * | 9/2008 | Aron ............................. | 340/465 |
| 7,455,436 | B2 * | 11/2008 | Rowland et al. .............. | 362/485 |
| 7,815,349 | B2 * | 10/2010 | Yoshino ....................... | 362/505 |
| 2003/0202356 | A1 | 10/2003 | Hung | |
| 2004/0184278 | A1 * | 9/2004 | Cheron et al. ................ | 362/505 |
| 2004/0207520 | A1 * | 10/2004 | Chuang ......................... | 340/475 |
| 2005/0024884 | A1 | 2/2005 | Seminara et al. ............ | 362/473 |
| 2007/0045983 | A1 * | 3/2007 | Hong ............................ | 280/282 |

FOREIGN PATENT DOCUMENTS

EP 0 685 384 A1 12/1995

(Continued)

*Primary Examiner* — Tony H. Winner
(74) *Attorney, Agent, or Firm* — Tarolli, Sundheim, Covell & Tummino LLP

(57) ABSTRACT

There is disclosed a vehicle, for example, a self-propelled and/or pedal vehicle such as a tricycle, bicycle, scooter, micro-scooter, or collapsible scooter, for example, adapted for use by children or infants. Accordingly, a self-propelled vehicle comprising illuminatable direction indicator means comprising left turn and right turn indictor means, which selectably operate by turning of a steering means or column of the self-propelled vehicle to the left or to the right, respectively, the steering means or column comprising handlebars in one embodiment. The self-propelled vehicle may comprise a tricycle.

33 Claims, 17 Drawing Sheets

FOREIGN PATENT DOCUMENTS

| | | |
|---|---|---|
| GB | 2 322 694 A | 9/1998 |
| GB | 2 326 513 A | 12/1998 |
| GB | 2 391 929 A | 2/2004 |
| JP | 2004-237965 | 8/2004 |
| JP | 2004-331040 | 11/2004 |
| WO | WO 02/23515 A1 | 3/2002 |

* cited by examiner

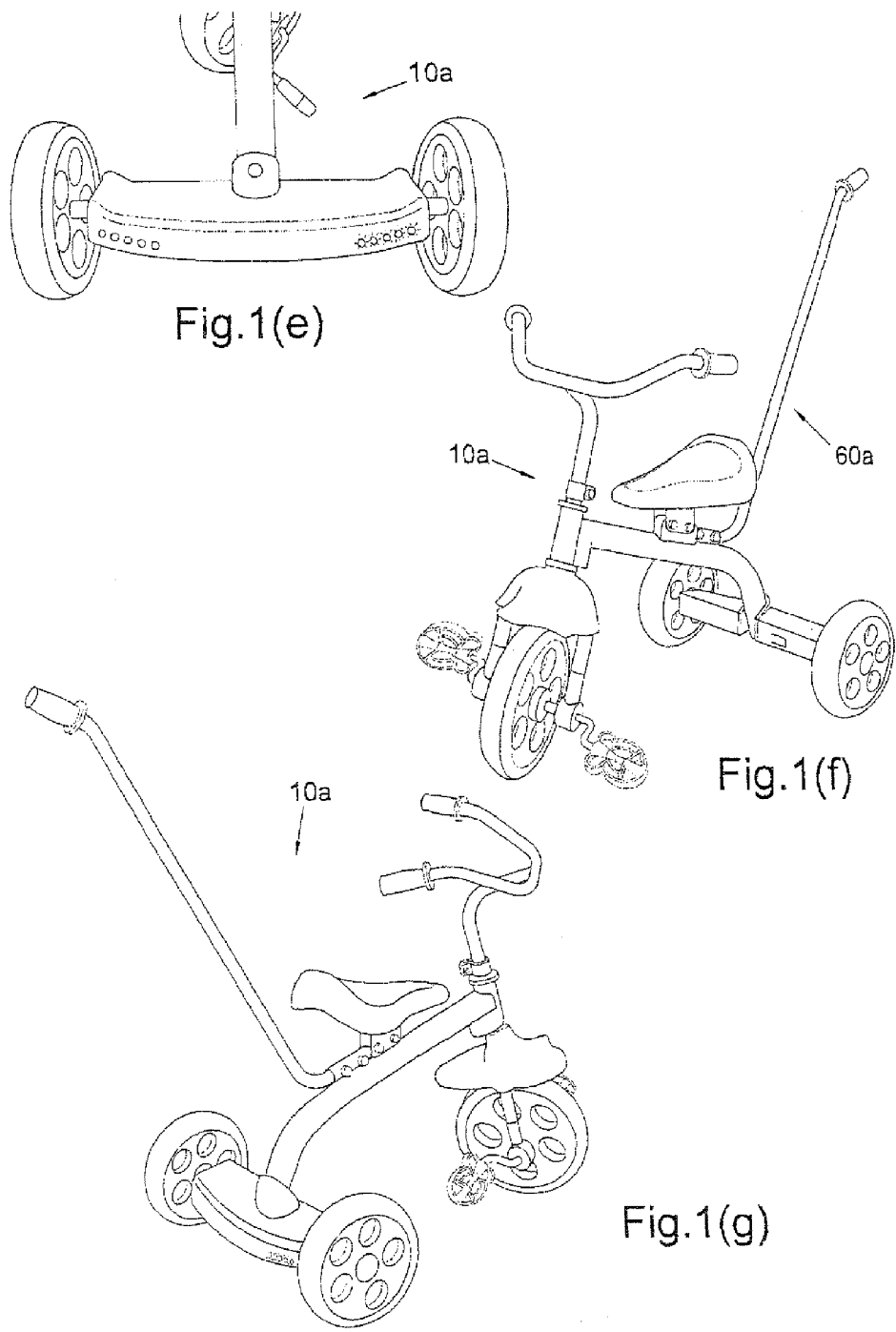

HUMAN-PROPELLED VEHICLES

FIELD OF INVENTION

This invention relates to improvements in and relating to vehicles, for example, human-propelled and/or pedal vehicles such as tricycles, bicycles, scooters, micro-scooters, and collapsible scooters. The invention particularly, though not exclusively, relates to such vehicles adapted for use by children or infants.

BACKGROUND TO INVENTION

Pedal vehicles such as tricycles, and other human-propelled vehicles such as scooters, are popular with children and infants as recreational or play articles.

It is an object of at least one embodiment of at least one aspect of the present invention to obviate and/or mitigate one or more disadvantages in the prior art.

It is an object of at least one embodiment of at least one aspect of the present invention to provide an improved vehicle.

It is an object of at least one embodiment of at least one aspect of the present invention to provide a vehicle having a novel lighting arrangement.

It is an object of at least one embodiment of at least one aspect of the present invention to provide a vehicle having a novel lighting or illumination effect.

SUMMARY OF INVENTION

According to a first aspect of the present invention there is provided a human-propelled vehicle comprising illuminatable direction indicator means.

The illuminatable direction indicator means may comprise left turn and right turn indicator means.

Left turn or right turn indicator means may be selectably operable by turning of a steering means or column of the human-propelled vehicle to the left or to the right, respectively. The steering means or column may comprise or provide handlebars, or alternatively a steering wheel.

The human-propelled vehicle may comprise a tricycle, such as for use by children or infants. Alternatively, the human-propelled vehicle may comprise a scooter.

The left turn and right turn indicator means may comprise at least one and preferably a plurality of LEDs, which may, in use, operate simultaneously or sequentially. The LED's may be of the same or of a mixture of colours.

The left turn and right turn indicator means may be rearward facing on the human-propelled vehicle. Alternatively or additionally, the left turn and right turn indicator means may be forward facing on the human-propelled vehicle.

The left turn and right turn indicator means may be provided between rear wheels of the tricycle.

The left turn and right turn indictor means may be provided on a rear footplate of the tricycle.

The illuminatable direction indictor means may be electrically powered by means of one or more batteries, which may be provided in or below the rear footplate.

Circuitry connecting the illuminatable direction indicator means to the one or more batteries may include an on/off switch.

The circuitry may also include control means within or adjacent a steering column of the vehicle. The control means may comprise a control member, and left and right switch means, which may be selectively activated by the control member, in use. The indicator means may therefore be self starting and self cancelling. That is to say, in use, turning of the steering column to one side may cause the control member to activate the switch means for that one side, and re-straightening of the steering column may deactivate the switch means for that one side.

The human-propelled vehicle may include a parent/guardian pole/handle, which may be rearward facing, and which may be detachable.

According to a second aspect of the present invention there is provided a human-propelled vehicle, such as a tricycle, comprising at least one illuminatable means on a wheel thereof.

The wheel may comprise a front wheel.

The vehicle may comprise a tricycle, e.g. for use by children or infants.

The vehicle may comprise left and right pedals carried by the front wheel.

The wheel may comprise a pneumatic tyre.

The wheel may comprise left and right walls, which may define a space therebetween. The walls may preferably be plastic, or alternatively, metal.

A pneumatic tyre may comprise a valve accessible through an aperture in one of the left or right walls.

The at least one illuminatable means may comprise a plurality of lights, e.g. LEDs. The lights may be of a same or of a mixture of colours.

At least some of the lights may be distributed in a closed shape, such as a circle, e.g. centred on a hub of the wheel, e.g. on one or both of the left and right walls. In an alternative implementation the lights may fan out from the hub of the wheel, e.g. in lines extending from the wheel, the lines possibly being straight, curved or wavy.

The at least one illuminatable means may be powered by one or more batteries, which may be provided on or in the wheel, e.g. in a battery compartment extending into said space.

The batteries may be accessible by a releasably securable cover, which may comprise or form part of one of the left or right walls.

The wheel may also provide an on/off switch for the at least one illuminatable means. The switch may provide a number of on positions to selectably allow the at least one illuminatable means to illuminate continuously or to operate in a predetermined sequence under the control of electronic control means.

According to a third aspect of the present invention there is provided a wheel for a human-propelled vehicle, the wheel comprising at least one illuminatable means thereon.

According to a fourth aspect of the present invention there is provided a wheel adapted for use in a human-propelled vehicle according to the second aspect of the present invention.

BRIEF DESCRIPTION OF DRAWINGS

Embodiments of the invention will now be described by way of example only, and with reference to the accompanying drawings, which are:

FIG. 1(e) rear view of part of the tricycle of FIG. 1(a);

FIG. 1(f) front view from one side of the tricycle of FIG. 1(a) according to a first modification;

FIG. 1(g) rear view of the modified tricycle of FIG. 1(f);

FIG. 3(c) top view of tricycle of FIG. 3(a);

FIG. 6(c) top view of tricycle of FIG. 6(a);

DETAILED DESCRIPTION OF DRAWINGS

Figure 1A:
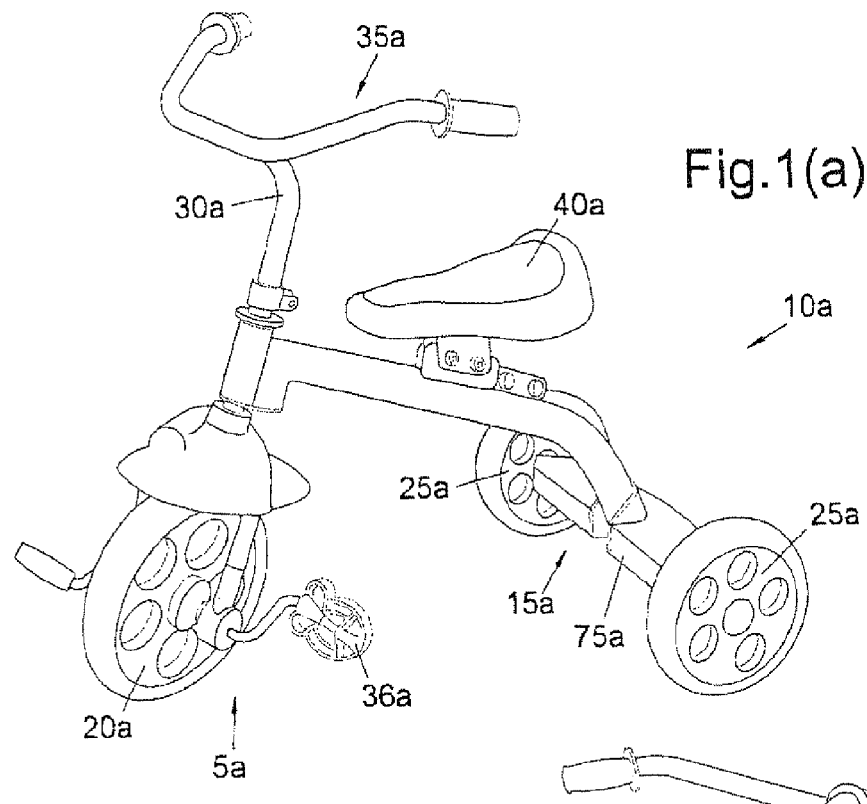
FIG. 1(a) view from front and to one side of a tricycle according to a first embodiment of the present invention.
Figure 1B:
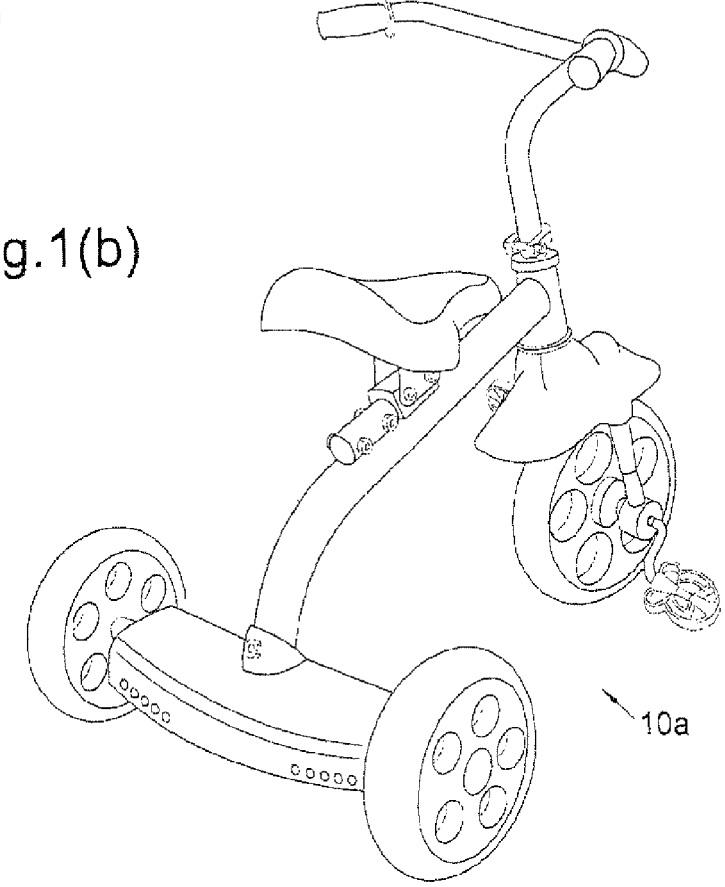
FIG. 1(b) view from rear and to other side of the tricycle of FIG. 1(a)
Figure 1C:
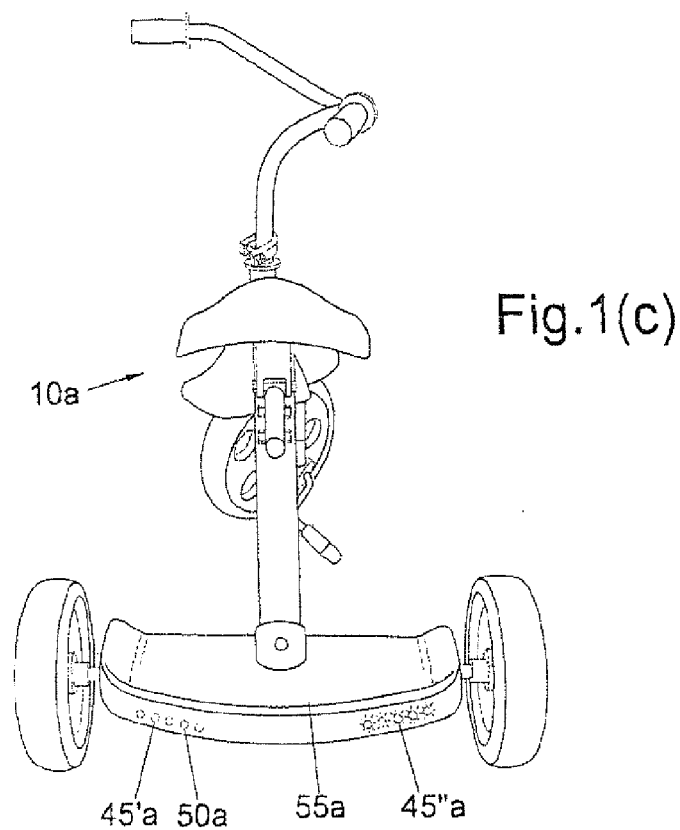
FIG. 1(c) rear view of the tricycle of FIG. 1(a) in a first illuminated state.
Figure 1D:
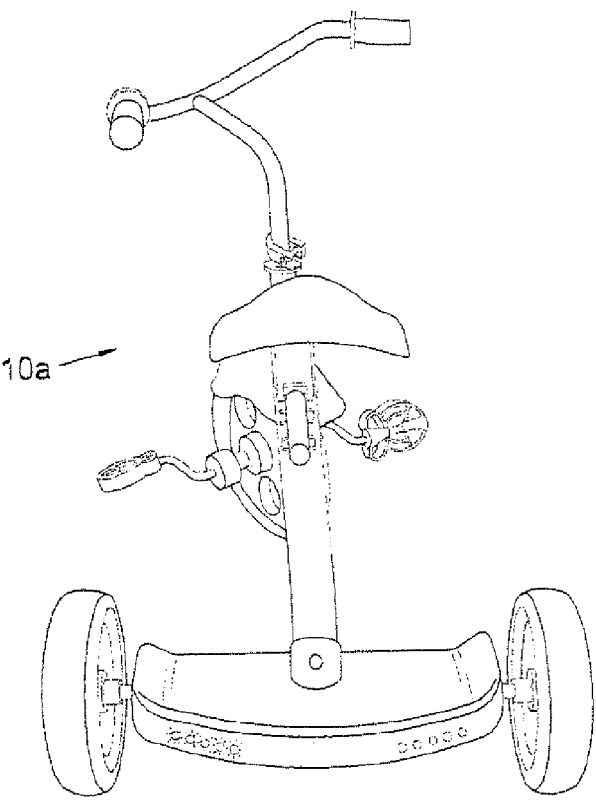
FIG. 1(d) rear view of the tricycle of FIG. 1(a) in a second illuminated state.

Referring to FIGS. 1(a) to 1(j), there is illustrated a human-propelled vehicle, generally designated 5a, according to an embodiment of the present invention.

The vehicle 5a comprises a tricycle 10a, e.g. for use by children or infants, having a frame 15a, a front wheel 20a, a pair of rear wheels 25a, steering column 30a, handlebars 35a, pedals 36a, and seat 40a.

The tricycle 10a comprises illuminatable direction indicator means 45a comprising left turn and right turn indicator means 45'a,45"a, which are selectively operable in use by a user turning handlebars 35a, and therefore front wheel 20a to the left or to the right respectively.

In this embodiment the left turn and right turn indicator means 45'a,45"a, each comprise a plurality of LEDs 50a, which when selected in use, can be adapted to operate simultaneously either constantly on or flashing, or sequentially flashing. In this embodiment the LEDs 50a are of a mixture of colours; however the LEDs 50a can be the same colour.

As can be seen from FIGS. 1(a) to 1(e), the left turn and right turn indicators 45'a, 45"a face rearward. In a modification the left turn and right turn indicator means 45'a,45"a may face forward, or alternatively, both forward and rearward. The left turn and right turn indicator means 45'a,45"a are provided between the rear wheels 25a on a rear footplate 55a of frame 15a.

Referring to FIGS. 1(f) to 1(g), there is shown a modification to the tricycle 10a comprising a parent/guardian pole/handle 60a, which can be made to be detachable, e.g. by fixing bolts or the like.

Figure 1H:
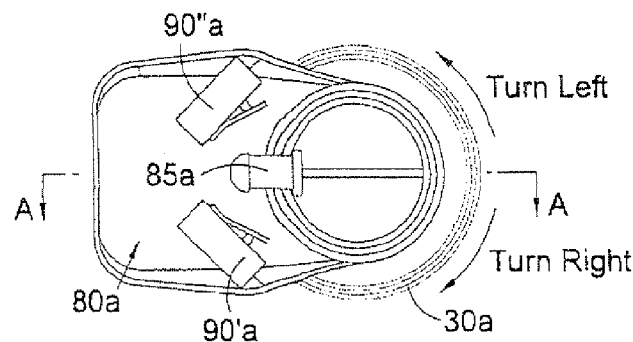
FIG. 1(h) cross-sectional view of a steering column of the tricycle of FIG. 1(a) viewed from above.
Figure 1I:
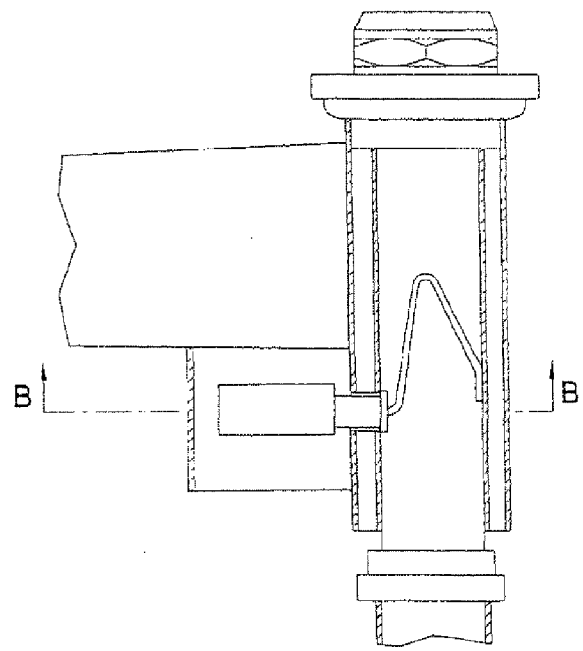
FIG. 1(i) cross-sectional view of the steering column of the tricycle of FIG. 1(a) viewed from the side.
Figure 1J:
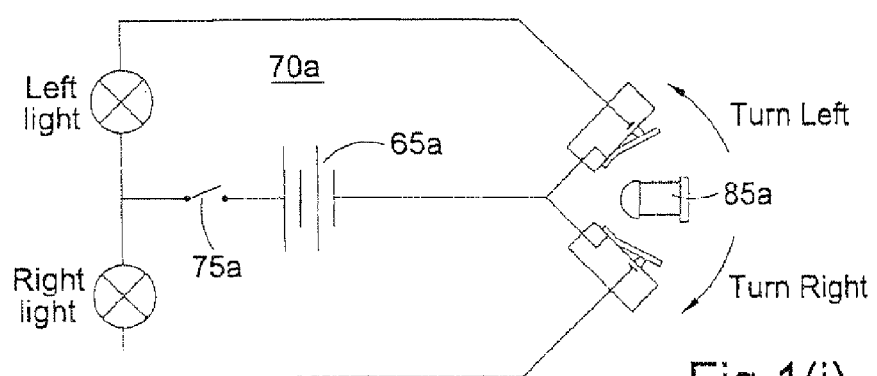
FIG. 1(j) circuit diagram for the tricycle of FIG. 1(a)
Figures 2A, 2B:
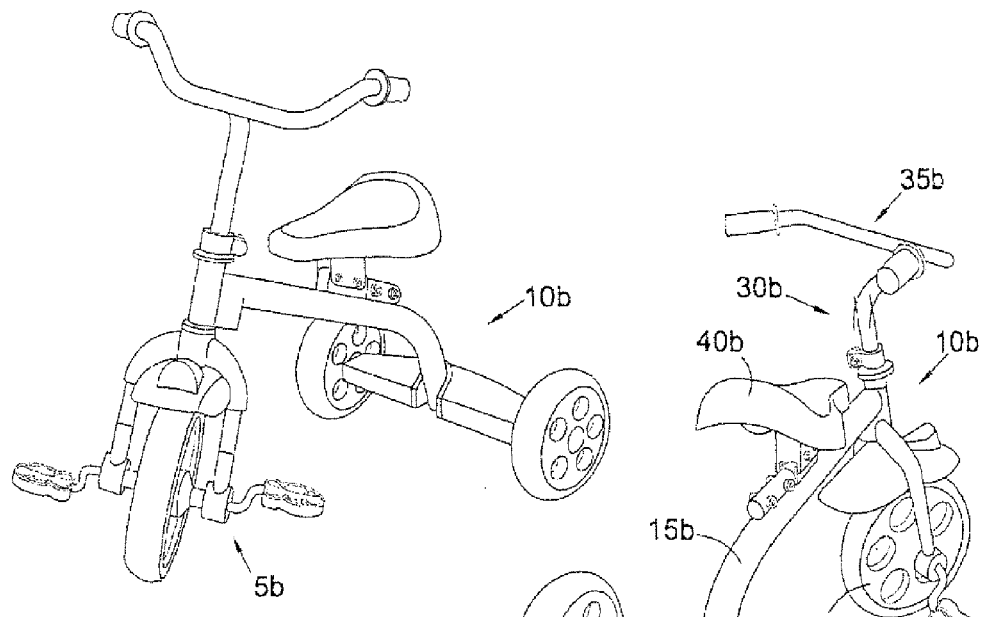
FIG. 2(a) view from front and to one side of a tricycle according to a second embodiment of the present invention.
FIG. 2(b) view from rear and to other side of the tricycle of FIG. 2(a)
Figures 2C, 2D:
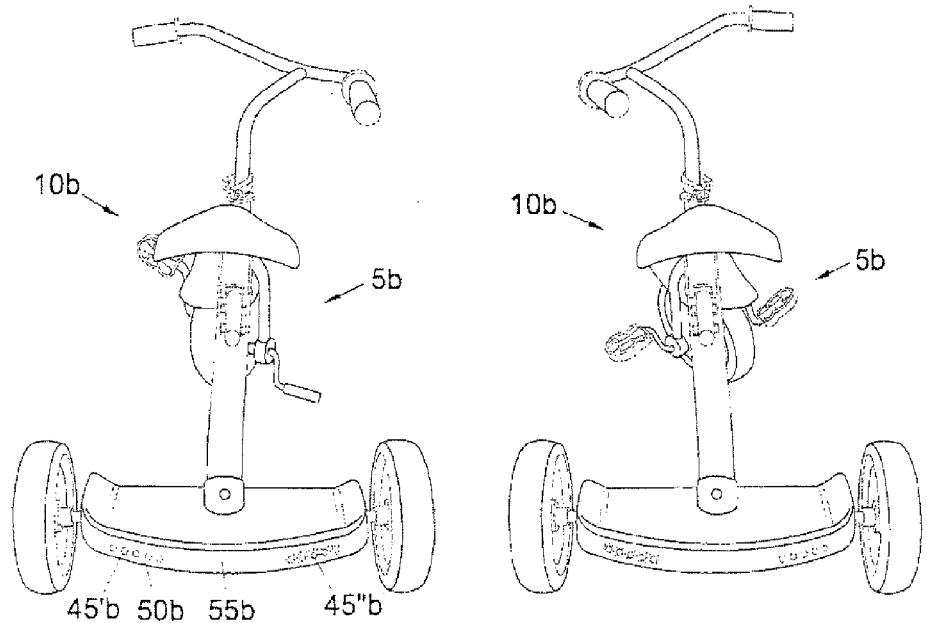
FIG. 2(c) rear view of the tricycle of FIG. 2(a) in a first illuminated state.
FIG. 2(d) rear view of the tricycle of FIG. 2(a) in a second illuminated state.
Figure 2E:
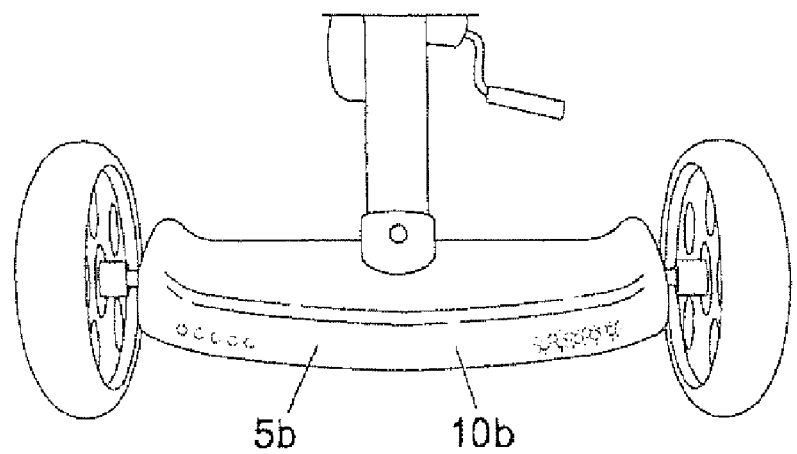
FIG. 2(e) rear view of part of the tricycle of FIG. 2(a) in first illuminated state.
Figure 2F:
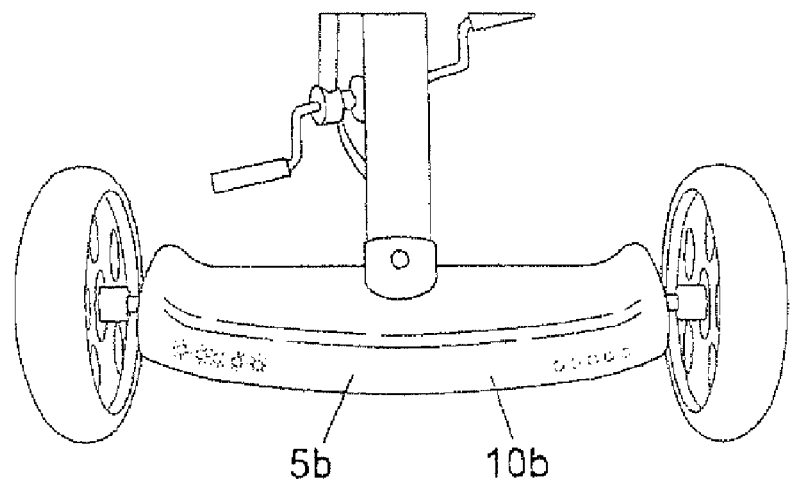
FIG. 2(f) rear view of part of the tricycle of FIG. 2(a) in second illuminated state.
Figure 2G:
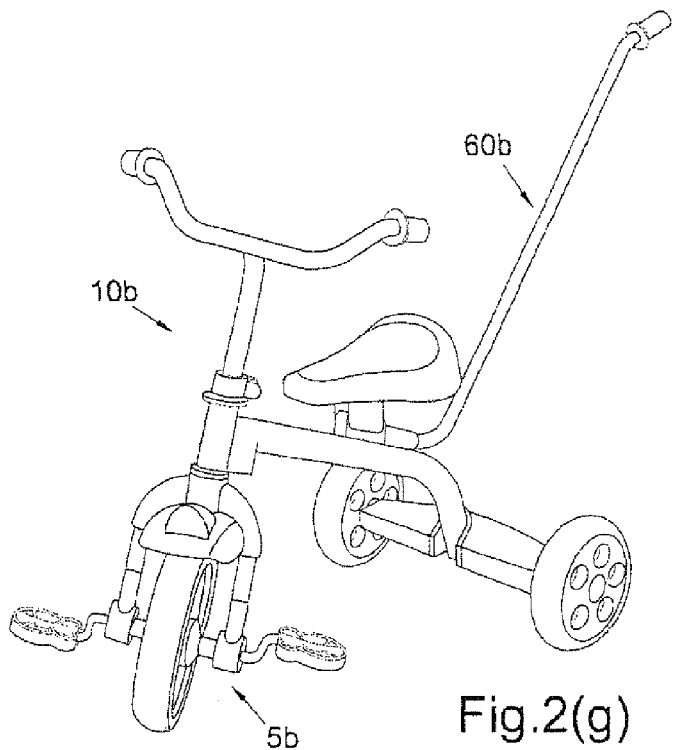
FIG. 2(g) front view from one side of the tricycle of FIG. 2(a) according to a first modification.
Figure 2H:
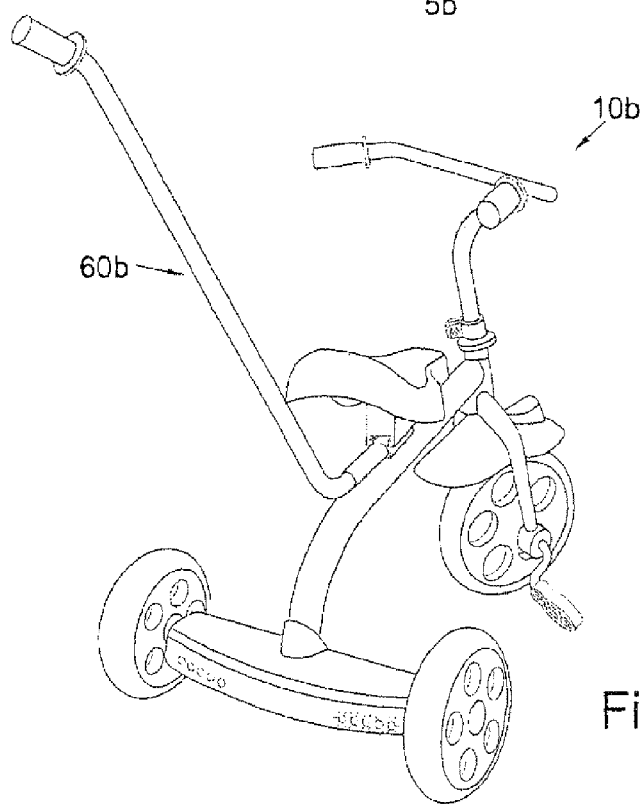
FIG. 2(h) rear view of the modified tricycle of FIG. 2(g)
Figure 3A:
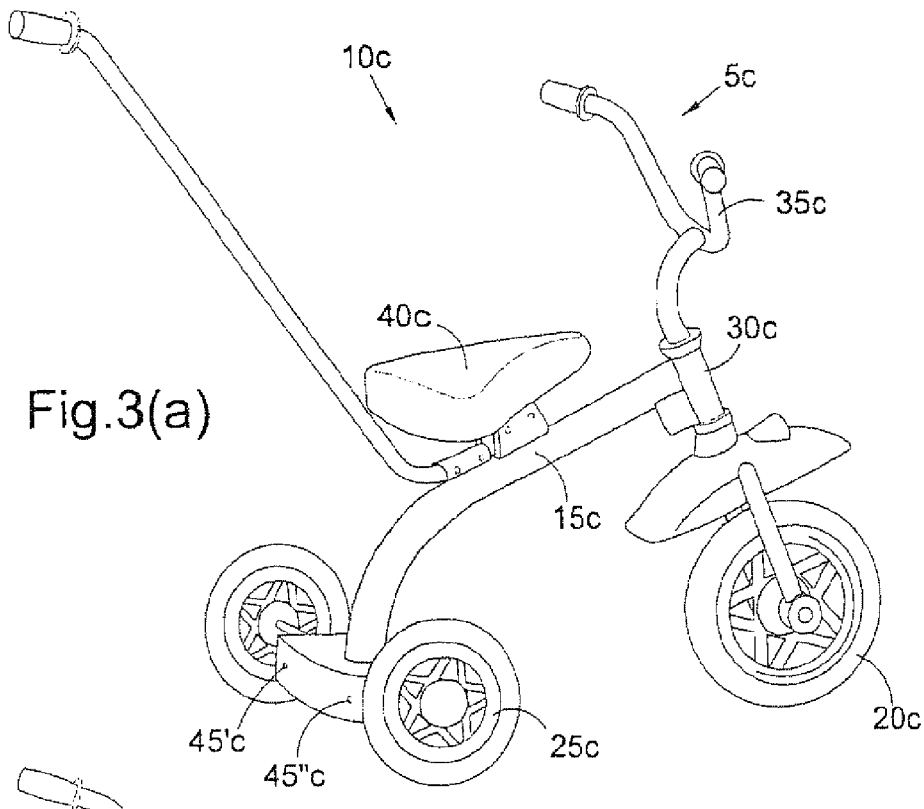
FIG. 3(a) view from rear and to one side of a tricycle according to a third embodiment of the present invention.
Figure 3B:
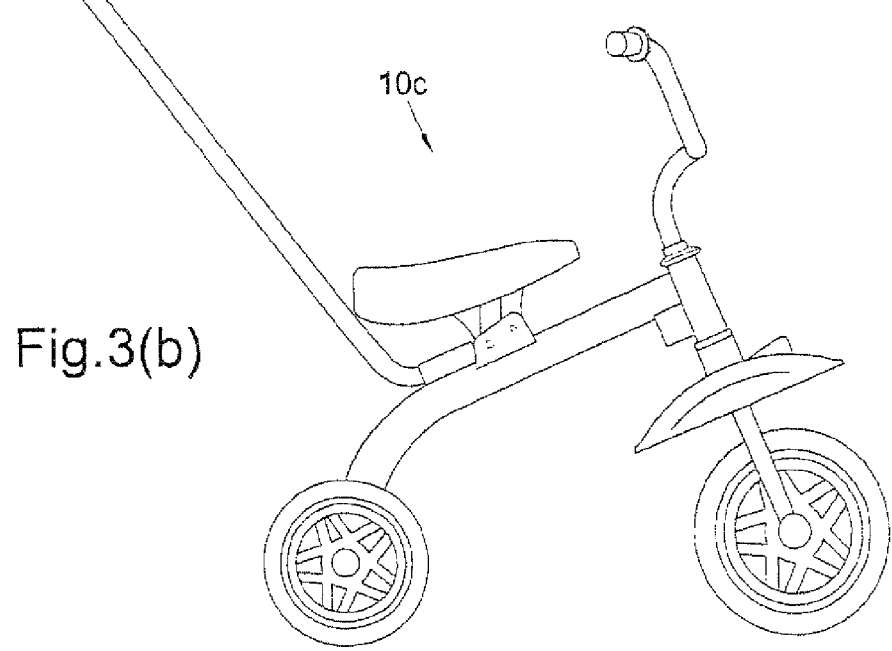
FIG. 3(b) side view of tricycle of FIG. 3(a)
Figure 3C:
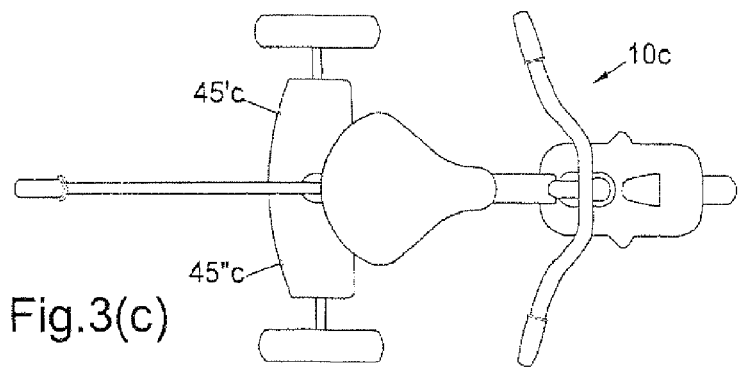
Figure 3D:
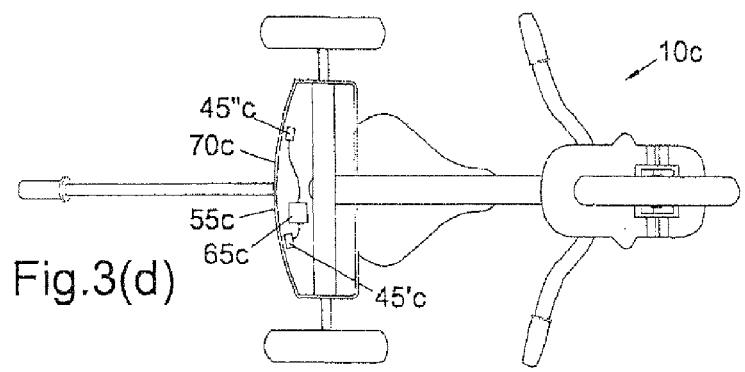
FIG. 3(d) bottom view of tricycle of FIG. 3(a)
Figures 3E, 3F:
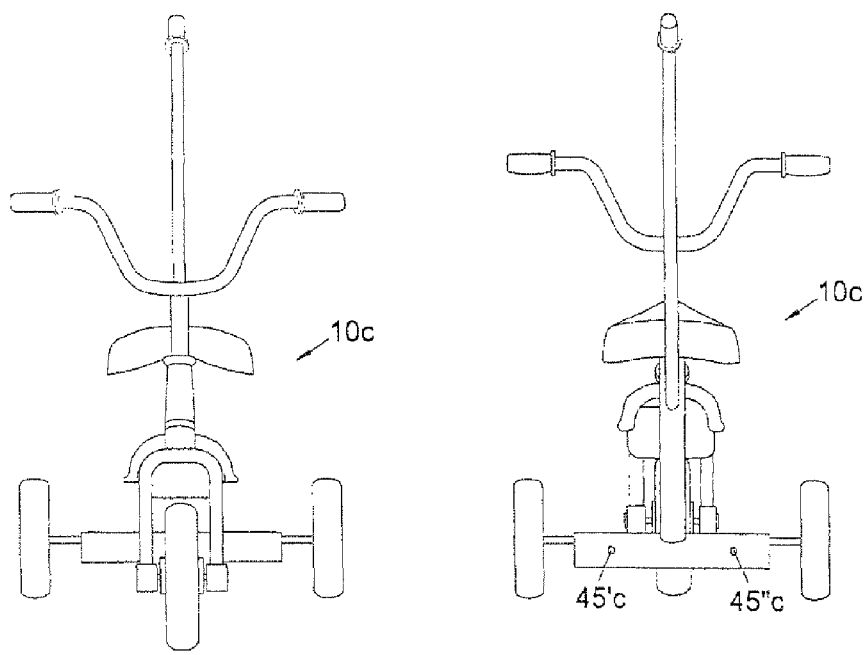
FIG. 3(e) front view of tricycle of FIG. 3(a)
FIG. 3(f) rear view of tricycle of FIG. 3(a)
Figure 4A:
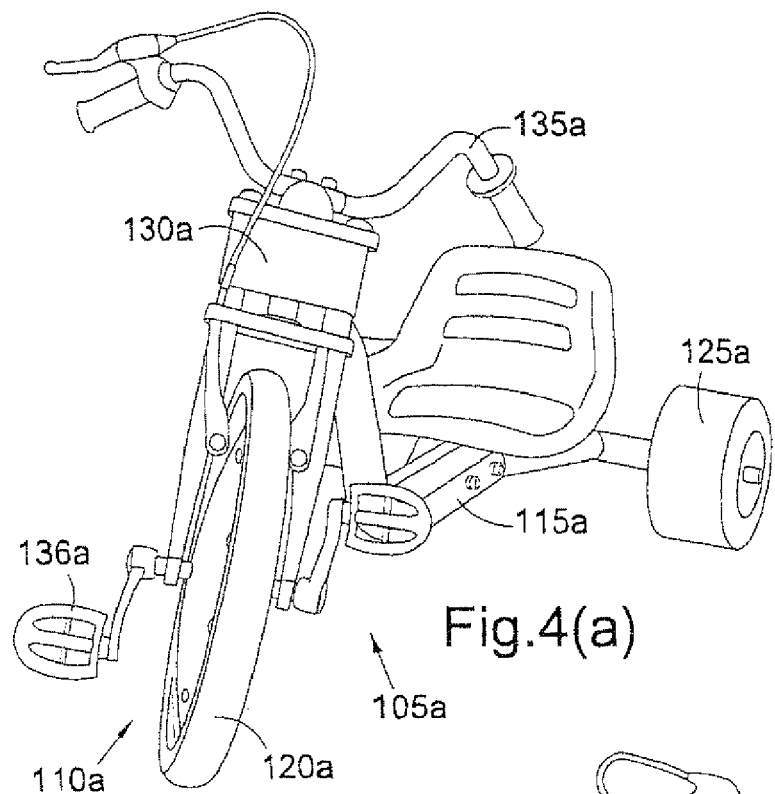
FIG. 4(a) view from front and to one side of a tricycle according to a fourth embodiment of the present invention.
Figure 4B:
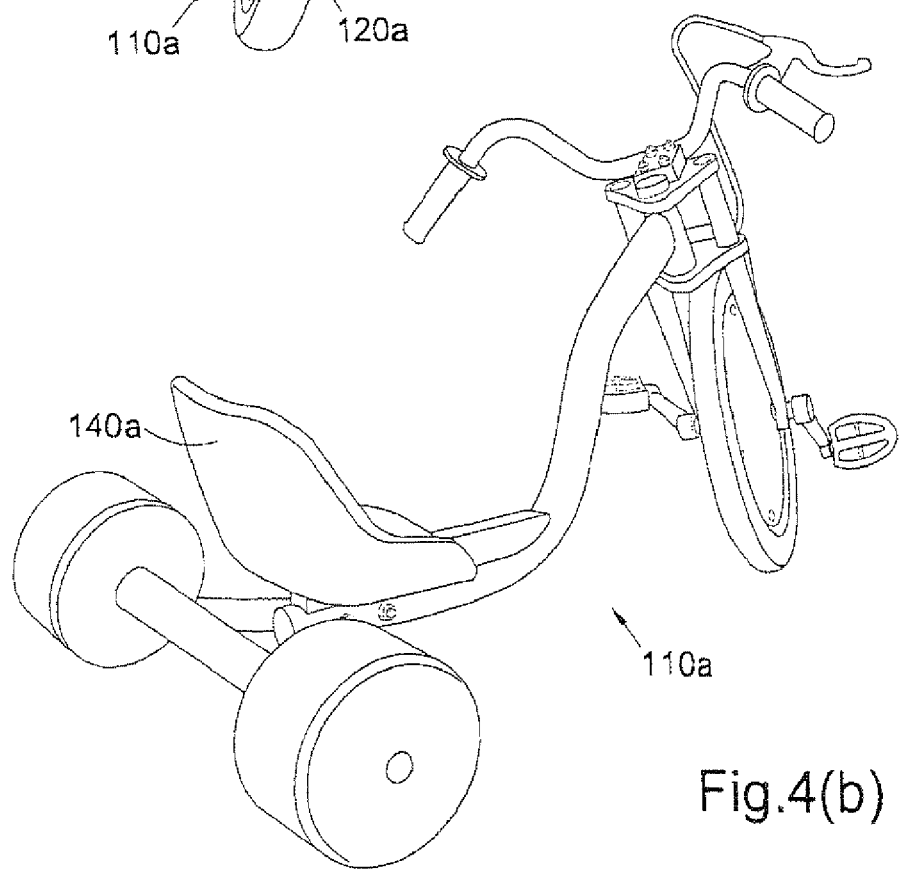
FIG. 4(b) view from rear and to other side of tricycle of FIG. 4(a)
Figure 4C:
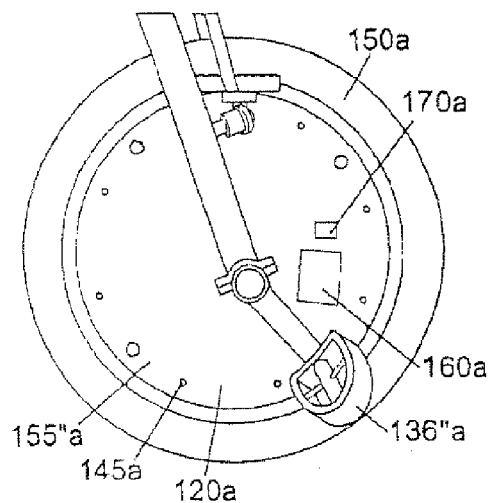
FIG. 4(c) view of right side of front wheel of tricycle of FIG. 4(a) in an illuminated state.
Figure 4D:
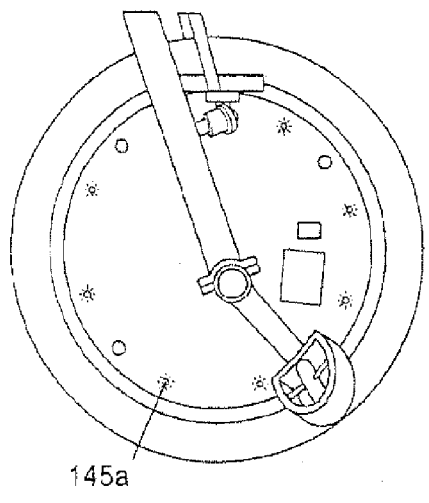
FIG. 4(d) view of right side of front wheel of tricycle of FIG. 4(a) in an illuminated state.
Figure 4E:
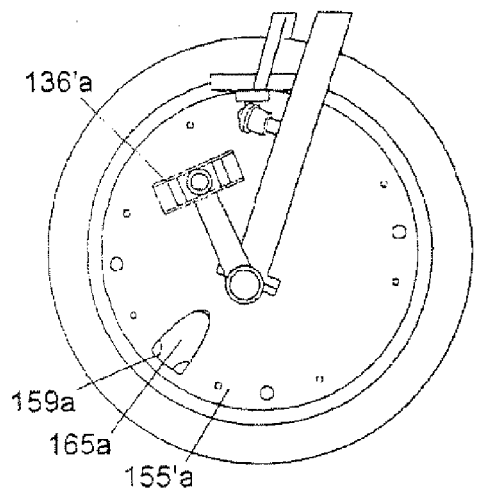
FIG. 4(e) view of the left side of front wheel of tricycle of FIG. 4(a) in a non-illuminated state.
Figure 4F:
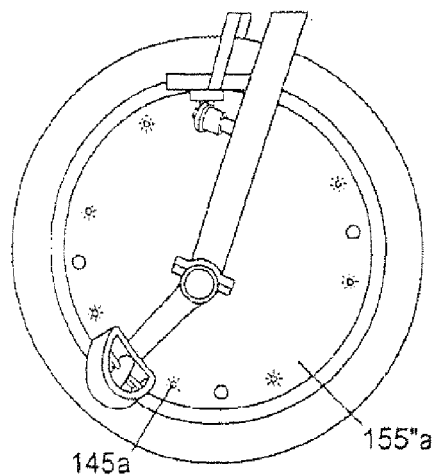
FIG. 4(f) view of left side of front wheel of tricycle of FIG. 4(a) in an illuminated state.
Figure 4G:
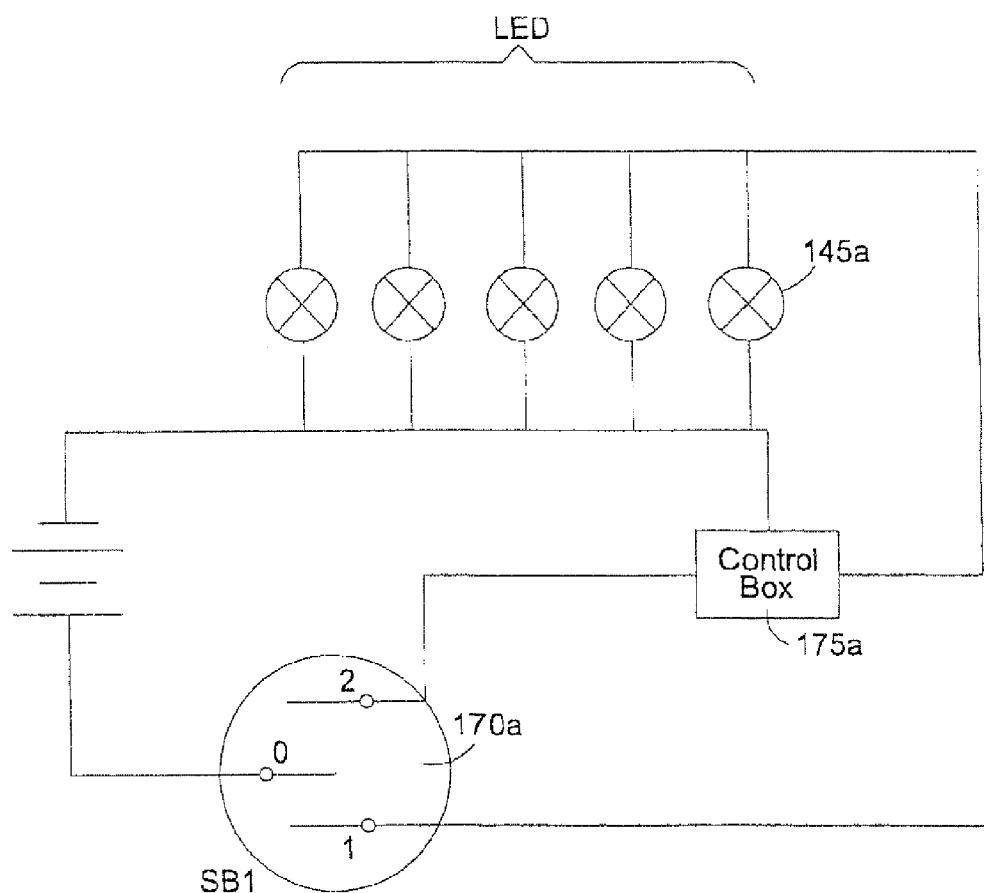
FIG. 4(g) circuit diagram for tricycle of FIG. 4(a)
Figure 5A:
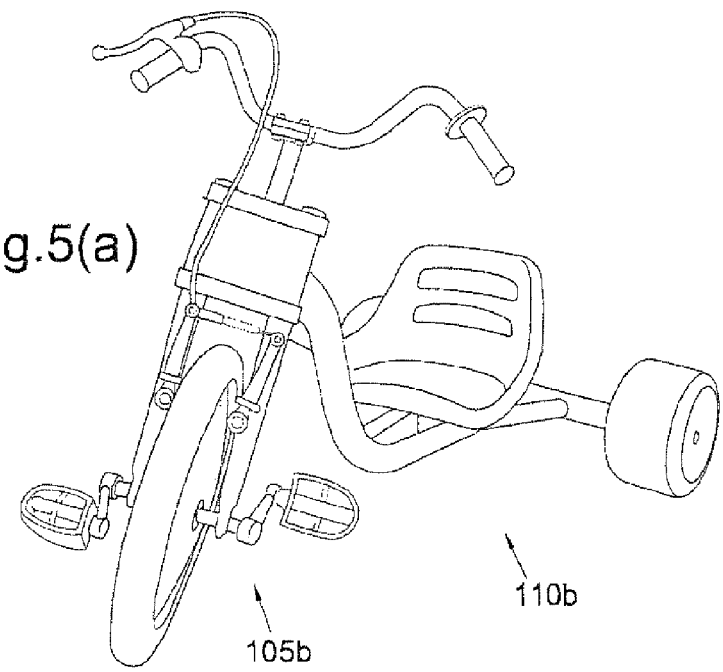
FIG. 5(a) view from front and to one side of a tricycle according to a fifth embodiment of the present invention.
Figure 5B:
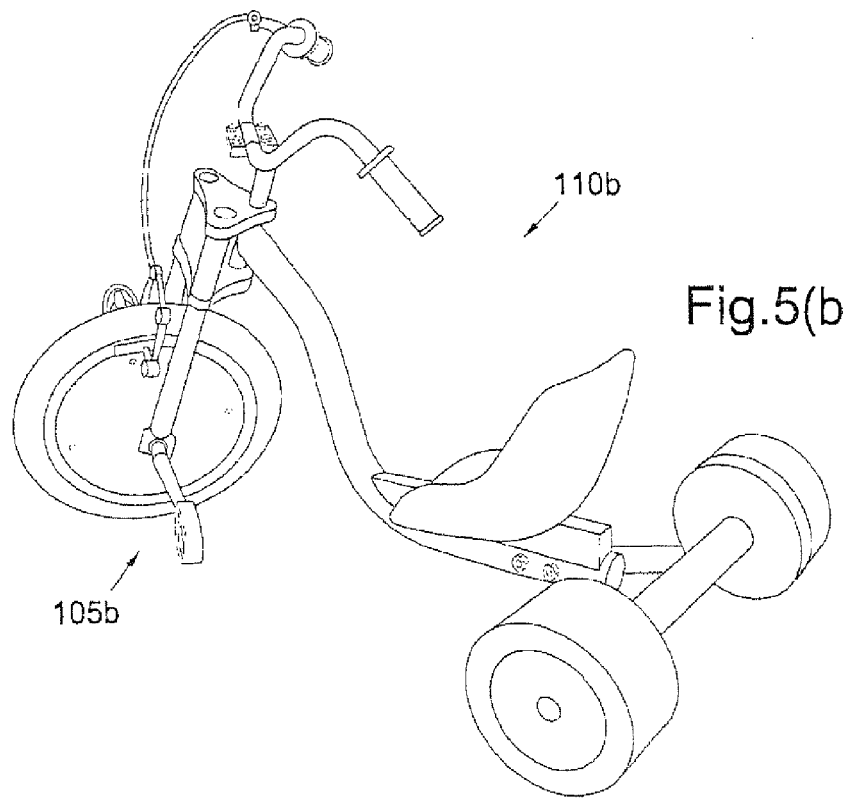
FIG. 5(b) view from rear and to other side of tricycle of FIG. 5(a)
Figure 5C:
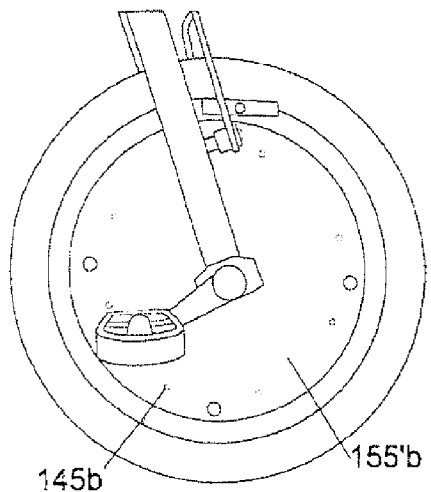
FIG. 5(c) view of right side of front wheel of tricycle of FIG. 5(a) in a non-illuminated state.
Figure 5D:
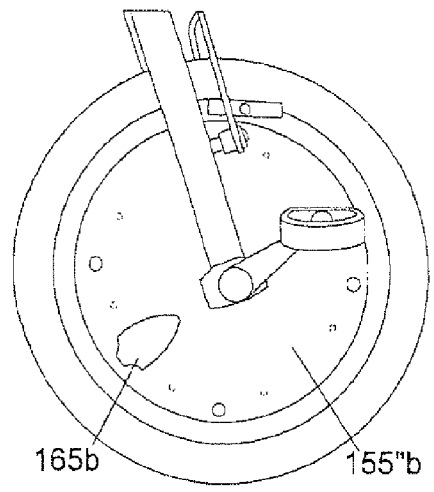
FIG. 5(d) view of right side of front wheel of tricycle of FIG. 5(a) in an illuminated state.
Figure 5E:
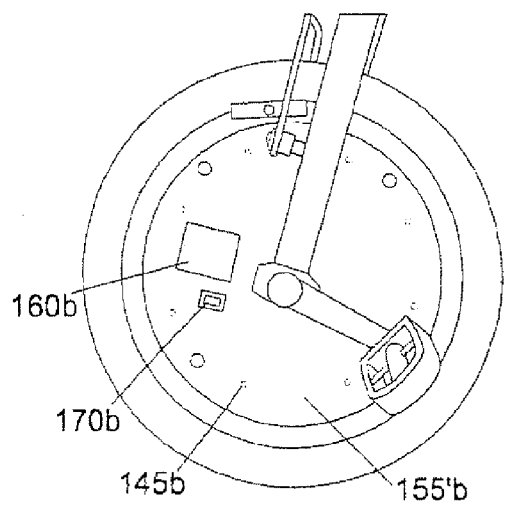
FIG. 5(e) view of left side of front wheel of tricycle of FIG. 4(a) in a non-illuminated state.
Figure 5F:
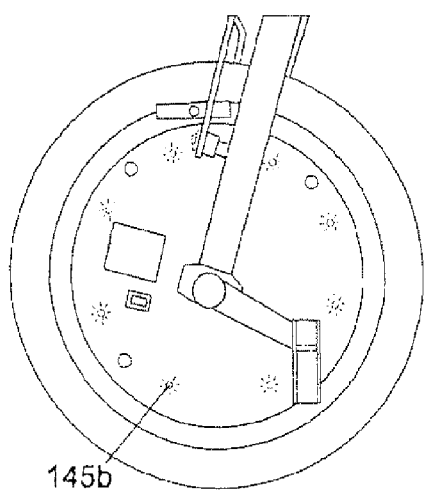
FIG. 5(f) view of left side of front wheel of tricycle of FIG. 5(a) in an illuminated state.
Figure 6A:
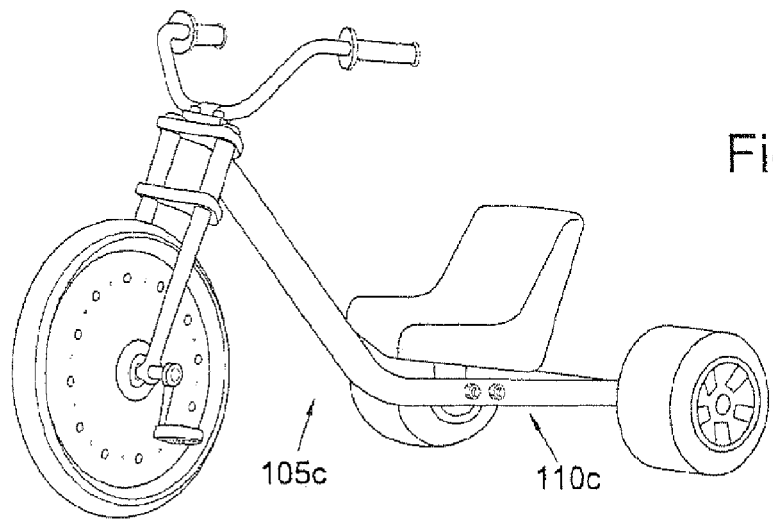
FIG. 6(a) view from front and to one side of a tricycle according to a sixth embodiment of the present invention.
Figure 6B:
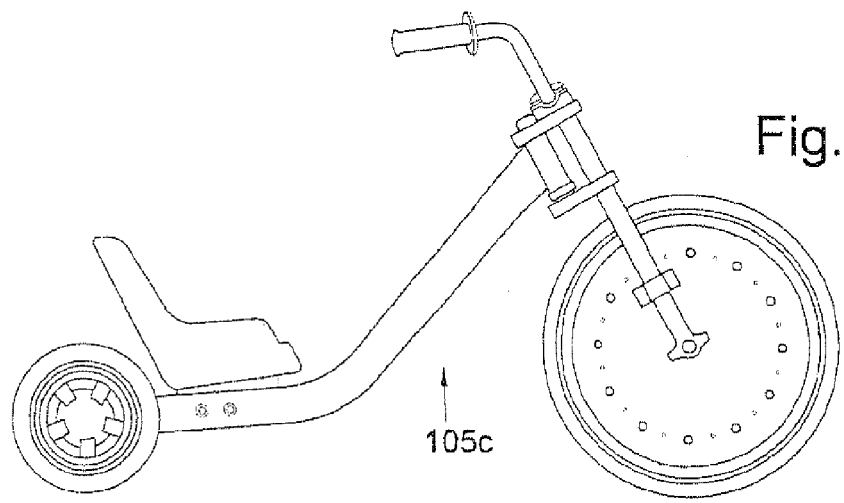
FIG. 6(b) side view of tricycle of FIG. 6(a)
Figure 6C:
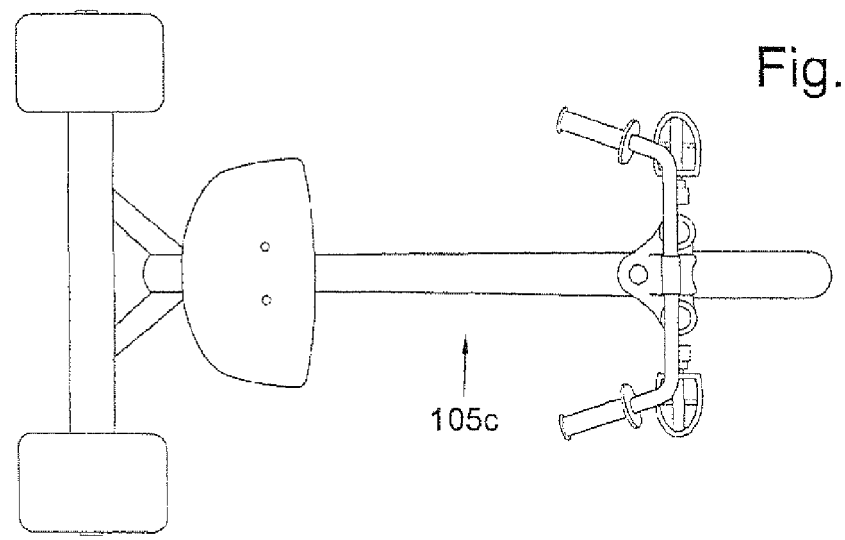
Figure 7A:
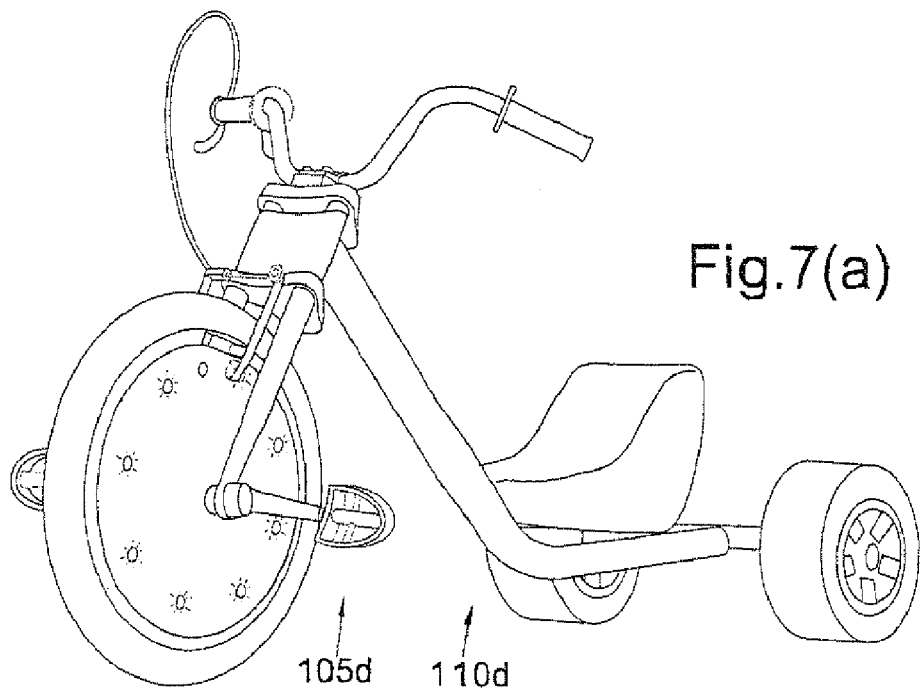
FIG. 7(a) view from front and to one side of a tricycle according to a seventh embodiment of the present invention in an illuminated state.
Figure 7B:
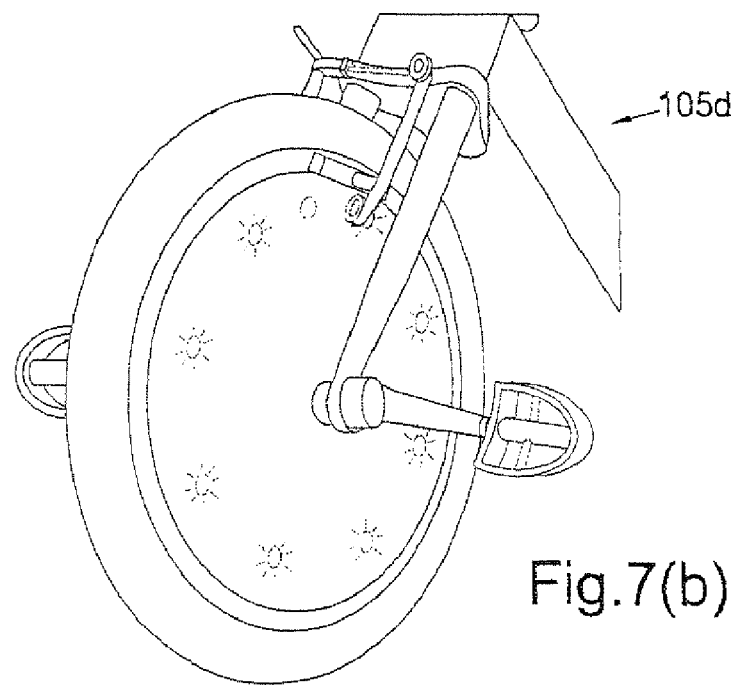
FIG. 7(b) perspective view of front wheel of tricycle of FIG. 7(a) in an illuminated state.

Referring now to FIGS. 1(h) to 1(j), the illuminatable direction indicator means 45a are electrically powered by means of batteries 65a provided under the rear footplate 55a.

Circuitry 70a connecting the illuminatable direction indicator means 45a to batteries 65a also includes an on/off rocker switch 75a and control means 80a within the steering column 30a. The control means 80a comprises a control member 85a (which moves with the handlebars 35a), and left and right switch 90'a,90"a, which are, in use, selectively activated by movement of the control member 85a.

Referring now to FIGS. 2(a) to 2(h) there is shown a human-propelled vehicle 5b according to a second embodiment of the present invention comprising a tricycle 10b. The tricycle 10b is substantially the same as that of the tricycle 10a, but differs therefrom in the colour scheme thereof. The tricycle 10a comprises a purple frame, blue tyres, and yellow wheels, and a blue seat, and red handle grips. The tricycle 10b comprises a blue frame, blue tyres, yellow wheels, a blue seat, and blue handle grips.

Referring now to FIGS. 3(a) to 3(f) there is shown a human-propelled vehicle 5c according to a third embodiment of the present invention comprising a tricycle 100. The tricycle 10c is substantially the same as that of the tricycle 10a but differs therefrom in that tricycle 10c does not have pedals, and is therefore foot propelled.

Referring to FIGS. 4(a) to 4(g) there is illustrated a human-propelled vehicle 105a according to a fourth embodiment of the present invention.

The vehicle 105a comprises a tricycle 110a, e.g. for use by children or infants, having a frame 115a, a front wheel 120a, a pair of rear wheels 125a, steering column 130a, handlebars 135a, pedals 136a, brake mechanism 137a, and seat 140a.

The tricycle 110a comprises at least one illuminatable means 145a on an outer surface of a wheel thereof, in this case, the front wheel 120a.

The vehicle 105a comprises left and right pedals 136'a, 136"a, carried by the front wheel 120a. The wheel 120a comprises a pneumatic tyre 150a.

The wheel 120a also comprises left and right walls 155'a, 155"a, which provide a gap, space or void (not shown) therebetween. The pneumatic tyre 150a comprises a valve 160a accessible via an aperture 165a in one of the left or right walls 155'a,155"a. The aperture 165a may be openably closeable by a cover member (not shown).

The at least one illuminatable means 145a comprises a plurality of light sources, particularly LEDs, either of the same or a mixture of colours. As can be seen from FIGS. 4(a) to 4(g), the lights are distributed in circles centred on a hub of front wheel 120a on both of the left and right walls 155'a, 155"a.

The at least one illuminatable means 145a is powered by a battery or batteries provided on or in the front wheel 120a in a battery compartment extending into the gap. The battery(ies) is/are accessible by a releasably securable cover 160a, which forms part of one of the left or right walls 155'a,155"a.

The front wheel 120a is also provided with an on/off switch 170a, e.g. rocker switch, for controlling the at least one illuminatable means 145a. The switch 170a is provided with two "on" positions to selectively allow the at least one illuminatable means 145a to illuminate constantly, or to operate in a predetermined sequence under the control of electronic control means 175a provided in the gap.

Referring now to FIGS. 5(a) to 5(f) there is shown human-propelled vehicle 105b according to a fifth embodiment of the present invention comprising a tricycle 110b. The tricycle 110b is substantially the same as that of the tricycle 110a, but differs therefrom in the colour scheme thereof. The tricycle 110a has a blue seat, blue rear wheels, and a blue and yellow front wheel. The tricycle 110b has a pink seat, pink rear wheels, and a black and pink front tyre.

Sixth and seventh tricycles 110c,110d according to embodiments of the present invention are shown in FIGS. 6(a) to 6(c), and FIGS. 7(a) and 7(b), respectively.

Figure 8A:
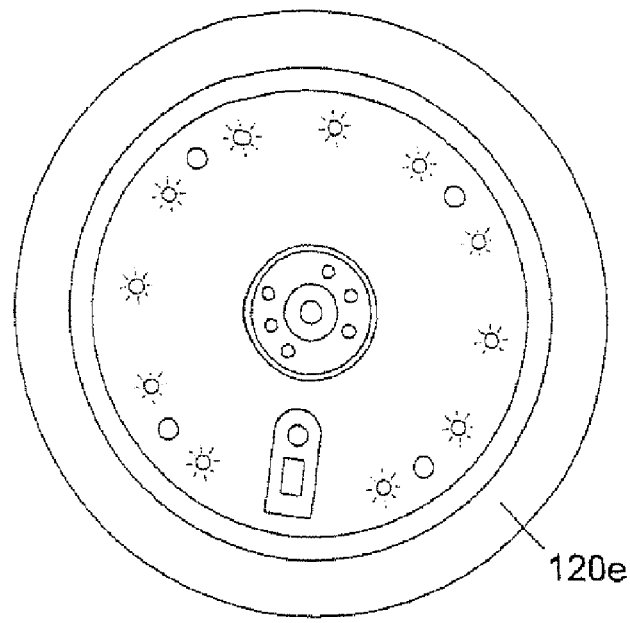
FIG. 8(a) view of one side of a wheel according to an embodiment of the present invention in an illuminated state.
Figure 8B:
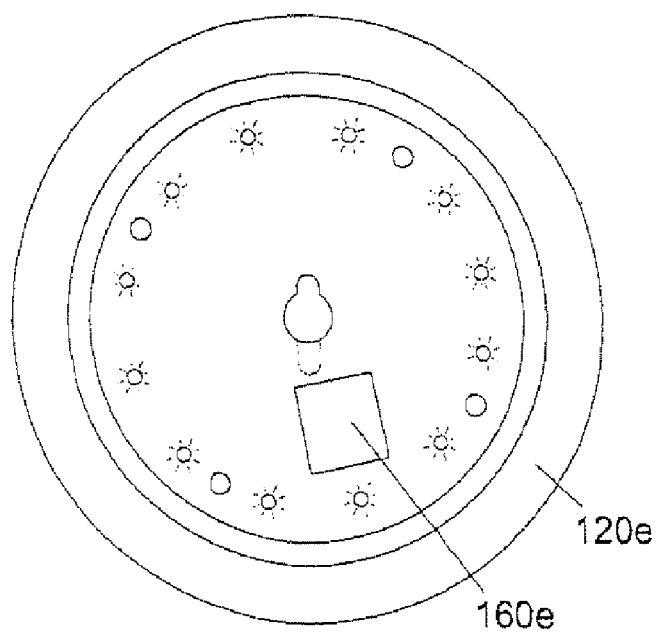
FIG. 8(b) view of other side of the wheel of FIG. 8(a) in an illuminated state.

Finally, in FIGS. 8(a) and 8(b) is shown a wheel 120e according to an eighth embodiment of the present invention.

It will be appreciated that the embodiments of the invention hereinbefore described are given by way of example only, and are not meant to limit the scope of the invention in any way.

It will be appreciated that in modified versions of the disclosed embodiments, the features of any one disclosed embodiment may be replaced by or added the features of any other disclosed embodiment. For example, the features of the first to third embodiments may be added to the fourth to seventh embodiments, and vice versa.

The invention claimed is:

1. A human-propelled vehicle comprising illuminatable direction indicator means and further comprising a steering means or column operably connected to the illuminatable direction indicator means, wherein the illuminatable direction indicator means comprise left turn and right turn indicator means, and wherein the left turn and right turn indictor means are selectably operable by turning of the steering means or column of the human-propelled vehicle to the left or to the right, respectively.

2. A human-propelled vehicle as claimed in claim 1, wherein the steering means or column comprises at least one selected from the group consisting of handlebars and a steering wheel.

3. The human-propelled vehicle as claimed in claim 1, wherein the human-propelled vehicle is configured as a pedal driven vehicle.

4. The human-propelled vehicle as claimed in claim 1, wherein the left turn and right turn indicator means each comprise at least one LED.

5. The human-propelled vehicle as claimed in claim 4, wherein each left turn and right turn indicator means comprises a plurality of LEDs which, in use, operate simultaneously or sequentially.

6. The human-propelled vehicle as claimed in claim 4, wherein the LEDs are selected from the group consisting of LEDs of a same color and LEDs of a mixture of colors.

7. The human-propelled vehicle as claimed in claim 1, wherein the left turn and right turn indicator means are rearward facing on the human-propelled vehicle.

8. The self-propelled vehicle as claimed in claim 1, wherein the left and right turn indicator means are forward facing on the human-propelled vehicle.

9. The human-propelled vehicle as claimed in claim 1, wherein the left turn and right turn indicator means are provided between rear wheels of the human-propelled vehicle.

10. The human-propelled vehicle as claimed in claim 1, further comprising a rear footplate of the human-propelled vehicle, wherein the left turn and right turn indicator means are provided on the rear footplate of the human-propelled vehicle.

11. The human-propelled vehicle as claimed in claim 1, wherein the illuminatable direction indicator means are electrically powered by means of one or more batteries which are provided in or below a rear footplate.

12. The human-propelled vehicle as claimed in claim 11, wherein circuitry connecting the illuminatable direction indicator means to the one or more batteries includes an on/off switch.

13. The human-propelled vehicle as claimed in claim 12, wherein the circuitry includes control means within or adjacent a steering column of the vehicle.

14. The human-propelled vehicle as claimed in claim 13, wherein the control means comprises a control member, and left and right switch means, which are selectively activated by the control member in use.

15. The human-propelled vehicle as claimed in claim 1, wherein the human-propelled vehicle includes a portion selected from the group consisting of a parent, guardian pole, and handle, and wherein the portion is rearward facing and is optionally detachable.

16. The human-propelled vehicle as claimed in claim 1, wherein the human-propelled vehicle is configured as a tricycle.

17. The human-propelled vehicle as claimed in claim 1, comprising at least one illuminatable means on a wheel thereof.

18. The human-propelled vehicle as claimed in claim 17, wherein the wheel comprises a front wheel.

19. The human-propelled vehicle as claimed in claim 18, wherein the vehicle comprises left and right pedals carried by the front wheel.

20. The human-propelled vehicle as claimed in claim 17, wherein the vehicle comprises a tricycle.

21. The human-propelled vehicle as claimed in claim 17, wherein the wheel comprises a pneumatic tire.

22. The human-propelled vehicle as claimed in claim 17, wherein the wheel comprises left and right walls, which define a space therebetween.

23. The human-propelled vehicle as claimed in claim 22, wherein the walls are made of plastic or metal.

24. The human-propelled vehicle as claimed in claim 22, wherein the wheel comprises a pneumatic tire which comprises a valve accessible through an aperture in one of the left or right walls.

25. The human-propelled vehicle as claimed in claim 17, wherein the at least one illuminatable means comprises a plurality of lights.

26. The human-propelled vehicle as claimed in claim 25, wherein the lights are selected from the group consisting of LEDs of a same color and LEDs of a mixture of colors.

27. The human-propelled vehicle as claimed in claim 25, wherein at least some of the lights are distributed in a closed shape.

28. The human-propelled vehicle as claimed in claim 25, wherein the lights fan out from the hub of the wheel.

29. The human-propelled vehicle as claimed in claim 17, wherein the at least one illuminatable means are powered by one or more batteries.

30. The human-propelled vehicle as claimed in claim 29, wherein the batteries are provided on or in the wheel.

31. The human-propelled vehicle as claimed in claim 29, wherein the batteries are accessible by a releasably securable cover.

32. The human-propelled vehicle as claimed in claim 17, wherein the wheel provides an on/off switch for the at least one illuminatable means.

33. The human-propelled vehicle as claimed in claim 32, wherein the switch provides a number of on positions to selectably allow the at least one illuminatable means to illuminate continuously or to operate in a predetermined sequence under the control of electronic control means.

* * * * *